Patented Dec. 20, 1927.

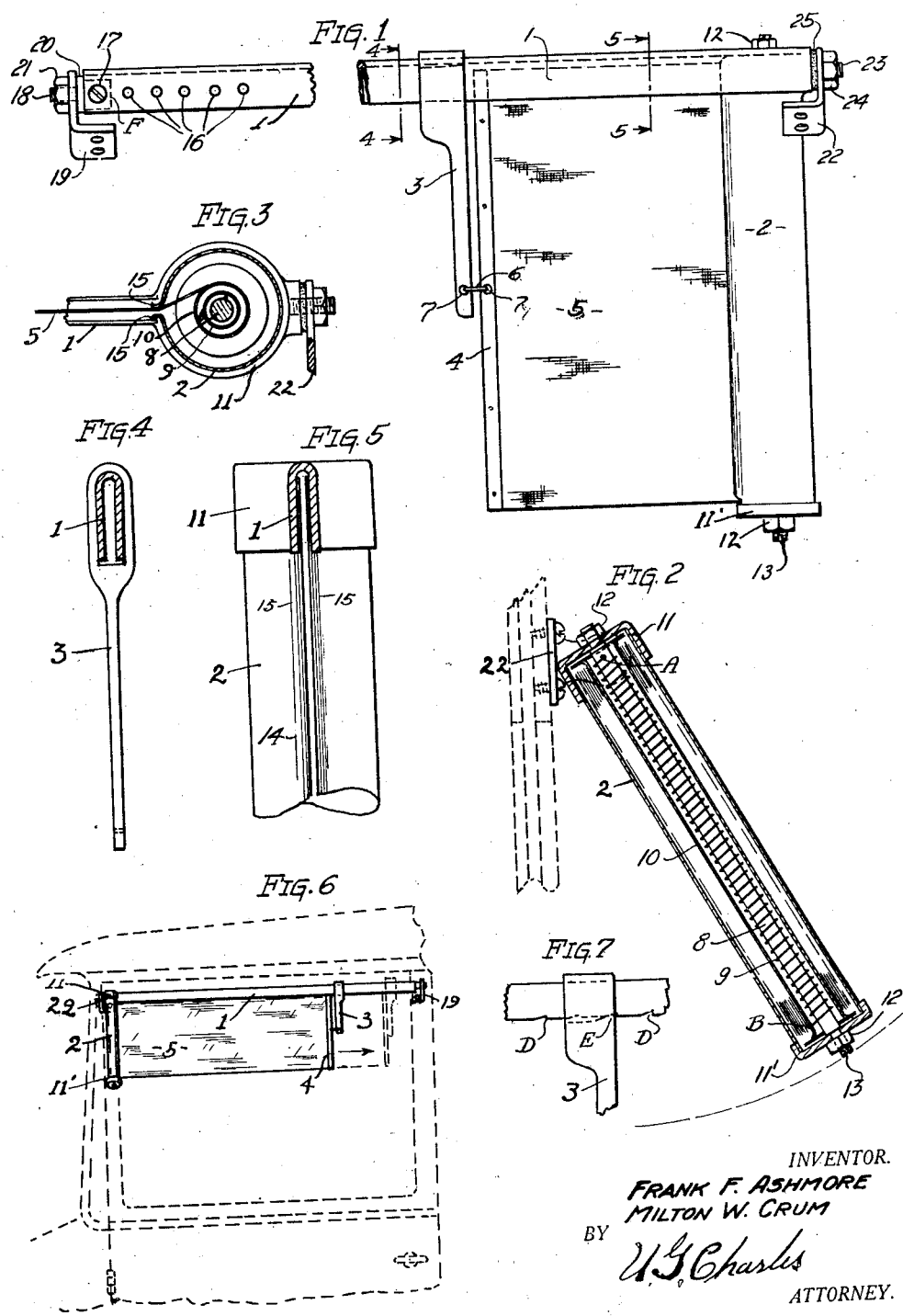

1,653,196

UNITED STATES PATENT OFFICE.

FRANK F. ASHMORE AND MILTON W. CRUM, OF QUENEMO, KANSAS, ASSIGNORS OF ONE-THIRD TO CHARLES P. HAWKINS, OF QUENEMO, KANSAS.

AUTOMOBILE AWNING.

Application filed August 10, 1926. Serial No. 128,421.

Our invention relates to improvements in automobile awnings, the objects of which are as follows:

First: To provide an awning that may be attached to the door or windows of a sedan or the like.

Second: To provide an awning that will wind longitudinally into a casing.

Third: To provide an awning that will tension the fabric shade member.

Fourth: To provide an awning that the upper side thereof will slidably engage in a U-bar protecting the fabric from excess vibration.

Fifth: To provide an awning that may be drawn into action while the automobile is being driven.

Sixth: To provide an awning that can be positioned at a desired angle from the side of the automobile.

These and other objects will hereinafter be more fully explained.

Referring to the drawings:

Fig. 1 is a side elevation of the awning, parts removed for convenience of illustration.

Fig. 2 is a transverse view of Fig. 1, the barrel being in section longitudinally.

Fig. 3 is a view looking in at the lower end of the barrel, cap being removed.

Fig. 4 is a sectional view through the U-bar, taken on line 4—4 in Fig. 1.

Fig. 5 is a sectional view through the U-bar taken on line 5—5 in Fig. 1.

Fig. 6 is a diagrammatical view of the side of a sedan automobile or the like in which is illustrated the position of the awning on the door.

Fig. 7 is a modification of the U-bar showing notches on the lower edges thereof, and a detent in the eye of the arm.

The mechanism herein disclosed consists of a U-bar 1 which is rigidly attached to a barrel 2. Slidably engaging on the bar is an arm 3 having an eye in the upper end thereof to conform to the shape of the bar. The downwardly extending end of the arm is adapted to engage with a strip 4 which is rigidly attached to a fabric member 5 by means of a link 6 engaging in apertures 7 and 7'; the said apertures being in the end of the arm and centrally positioned in the strip 4.

Concentrically positioned in the barrel 2 is a rod 8 having a spiral spring 9 wound thereon, one end of the spring being attached to the rod as at A, the opposite end being attached to a sleeve 10 as at B. The said rod and spring is housed by the sleeve which is revolvably mounted on the rod. The said sleeve functions as a roller on which the fabric winds, being tensioned by the spring 9. The ends of the barrel are closed by caps 11 and 11'. The cap 11 being integral with the bar and rigidly attached while the cap 11' is removable, and the said caps having apertures concentrically positioned therein function as bearings for the rod 8. The said rod is bound firmly therein by means of nuts 12 threadedly engaging in the ends thereof.

When the awning is wound on the sleeve without interrupting the tension of the spring and greater tension being required to stretch the awning tightly when drawn outward, we have provided an eye 13 in one end of the rod in which a screw driver may be placed to wind up the spring and when properly tensioned the nuts 12 function as binding means for the rod to the barrel.

It will be understood that the fabric member will pass from the barrel through a slot 14, the said slot being formed by cutting the barrel longitudinally in one side and turning the edges outward forming lips as at 15. The said lips being adapted to receive the edge of the metal strip 4 snugly therein when the fabric is wound on the sleeve.

To manipulate the fabric functioning as an awning we take hold of the arm 3 near the center between the link and the eye and draw them simultaneously along the bar, and when the desired extent is acquired we release the hold on the arm and immediately the tension of the fabric at the end thereof will cause the eye to bind firmly on the bar which is the anchoring means therefor; the opposite end being tensioned by the spring in the sleeve.

To disengage the mechanism as an awning we rock the arm overcoming the tension of the fabric and allow both fabric and arm to slide freely towards the barrel as the sleeve winds the fabric snugly thereon.

As heretofore stated when the tension of the awning is imposed at the end of the arm it will cause the eye thereof to bind firmly, and the tension of the spring will be sufficient to stretch the fabric to prevent undue vibration of the lower edge thereof while the automomible is being driven. The upper edge being positioned in the groove of the bar is means for further protection of the fabric.

As a modification of the U-bar we have shown in Fig. 7 a series of notches D adapted to engage with a detent shown by dotted lines as at E, by which means vibration of the automobile will not tend to loosen the grip thereof allowing it to recede with the fabric as tensioned by the spring.

To vary the length of the bar we have provided a plurality of apertures 16 between which the bar may be cut, the said apertures are adapted to receive a screw 17 threadedly engaging in the lug of the stud 18 as shown by dotted lines F and the said lug engaging in the groove of the bar is rigid means for pivotally hanging the end thereof to a bracket 19 which is rigidly attached to the side of the door or frame adjacent the glass; the said bracket loosely engaging between the shoulder 20 and the nut 21 is means to allow the said bar to revolve freely.

The bracket 22 supporting the opposite end of the bar on the door is tensioned on the stud 23 between the nut 24 and a fiber washer 25 by which means friction is acquired to support the barrel at any desired angle from the side thereof carrying with it the fabric functioning as an awning.

We do not confine the use of our awning to automobiles or other vehicles alone as the same may be applied for other purposes, and such modifications in the construction thereof may be employed as lie within the scope of the appended claim.

Having thus described our invention, what we claim as new and desire to secure by Letters Patent is:—

In an automobile awning, in combination with a body of an automobile, a U-bar having a barrel transversely positioned and rigidly connected to one end thereof, the bar and barrel rockably mounted on brackets connected to the body of an automobile, a flexible washer to bind on the bracket adjacent the barrel as friction means supporting said barrel horizontally or angling outward, a slot longitudinally in the wall of the barrel with the upper end thereof in registry with the slot in the U-bar so that a spring actuated fabric member may be drawn therefrom with the upper edge thereof slidably engaging in the slot of the said U-bar, an apertured strip rigidly connected to the outer end of the fabric member, an arm having an eye in one end thereof to slidably engage on the bar, the eye being slightly longer than the width of the bar so that the ends thereof will contact the edges of said bar when rocked longitudinally therewith, the opposite end of the arm having a link to connect with the aperture of the strip so that the tension of the fabric member will cause the said arm to bind at any selected point along the bar to prevent retraction, all as and for the purpose described.

FRANK F. ASHMORE.
MILTON W. CRUM.